United States Patent
Petersson

[11] 3,904,111
[45] Sept. 9, 1975

[54] TEMPERATURE RESPONSIVE FLOW REGULATING LAMINATED CONDUIT

[75] Inventor: Lars Henry Petersson, Torslanda, Sweden

[73] Assignee: AB Volvo Penta, Goteborg, Sweden

[22] Filed: May 15, 1973

[21] Appl. No.: 360,567

[30] Foreign Application Priority Data
May 23, 1972 Sweden.............................. 6693/72

[52] U.S. Cl. .................... 236/93; 137/468; 138/46; 138/177; 236/101 R
[51] Int. Cl. ....................... G05d 23/12; F16l 11/12
[58] Field of Search ........... 138/140, 141, 133, 137, 138/138, 126, 46, 177; 220/63 A; 161/178, 405; 156/187; 236/102, 93, 101 R; 137/72, 468

[56] References Cited
UNITED STATES PATENTS

| | | | |
|---|---|---|---|
| 2,308,342 | 1/1943 | Wilkinson et al. | 138/133 |
| 2,319,498 | 5/1943 | Gerard | 236/93 X |
| 2,383,733 | 8/1945 | Parker | 138/126 |
| 2,429,688 | 10/1947 | Hoover | 220/63 A X |
| 2,682,336 | 6/1954 | Moberly | 220/63 A X |
| 2,792,180 | 5/1957 | Flagg | 236/102 X |
| 3,322,345 | 5/1967 | Getz | 236/93 |
| 3,550,640 | 12/1970 | Wagner et al. | 138/141 |
| 3,688,982 | 9/1972 | McAninch | 138/46 X |
| 3,712,342 | 1/1973 | Lang | 236/102 X |

Primary Examiner—Jerry W. Myracle
Assistant Examiner—Daniel M. Yasich
Attorney, Agent, or Firm—Young & Thompson

[57] ABSTRACT

A conduit such as a hose, a pipe or the like is disclosed, intended for transport of combustible media. The conduit comprises at least two layers, namely an inner layer at least partially made up of temperature responsive expandable polymer material and a more resistant outer layer surrounding said inner layer; the polymer material at a certain predetermined temperature expands, thereby blocking the flow channel of the conduit.

2 Claims, 4 Drawing Figures

TEMPERATURE RESPONSIVE FLOW REGULATING LAMINATED CONDUIT

The invention relates to a conduit made up of at least two layers and especially intended for transport of combustible media. Such a conduit can be in the form of a hose, a pipe or the like. The intended media are for example, liquids, gases, powders or the like.

There is a great market demand for flexible conduits, for transport of fluids, primarily chemical products, e.g. fuel for combustion engines. Use is especially great in automobiles, vessels, airplanes and in processing industries.

Presently hoses of rubber, plastics or metal are used primarily. However, there are great risks connected with the use of such hoses. A hose of plastic or rubber breaks easily at unintentionally occurring high temperatures, such as in a fire, and the transported combustible, poisonous or corrosive material leaks out and causes damage. A metal hose is expensive and has limited flexibility and life. Polymer hoses reinforced with asbestos cloth also exist but are expensive and have limited flexibility.

Said disadvantages in known conduits are avoided according to the invention with the help of a conduit whose flow channel is blocked as a result of high surrounding temperature. The conduit of the type just mentioned is characterized in that an inner layer is at least partially constructed of expandable polymer material, that an outer layer is pressure and temperature resistant and surrounds the polymer layer, and that when a temperature responsive layer is heated to a certain predetermined temperature the polymer material expands thereby blocking the flow channel of the conduit.

According to one preferred embodiment the polymer material contains a component — an expanding agent — which produces gas at the predetermined temperature. According to another preferred embodiment the polymer material is separated from a reagent material by a temperature responsive layer, and when the temperature responsive layer melts, the polymer material comes into contact with the reagent material and reacts causing expansion.

The polymer expansion material can be any polymer material at all suitable for the manufacture of hoses and other conduits, and which is swellable. Preferably the material should have certain desirable characteristics, such as good fire resistance, flexibility at low temperatures, low gas permeability, resistance to chemical attack, flame resistance and high fatigue resistance. Appropriate polymer materials for this purpose include various types of rubber, such as expandable raw rubber mass, e.g. nitrile rubber and epichlorhydrine rubber. Rubber mass in porous form can also be used, such as sponge and cellular rubber. In addition to this expandable plastic materials can also be used.

The conduit, preferably in the form of hose, can be constructed of two or more layers with different functions. Thus it is appropriate to place a pressure and temperature resistant layer outside a layer of the polymer expansion material so that the polymer expansion material when it swells is prevented from expanding radially outwards; instead it expands inwards and in this way stops up the flow channel of the hose. The pressure and temperature resistant layer can consist of a material with good thermal conductivity and, for example be made up of braided wire including metal wire, wire or metal strips in spiral form, asbestos cloth, or asbestos cord, textile fabrics or textile thread or of glass fibre, possibly baked into a polymer layer or it can also merely consist of a rubber or plastic layer, which is capable of withstanding expansion. The pressure and temperature resistant layer can also be combined with a heat conducting layer or constitute such a layer itself. The heat conducting layer can for example consist of wire. It then has the simultaneous function of carrying off static electricity.

If the polymer expansion material can be affected by or react with the flowing media it is appropriate to place a thin insulating layer next to the flowing media inside the layer of expansion material. For example, in a gasoline hose a polyamide film can be placed as an insulating layer.

If the expansion material lacks some characteristics so that it cannot make up the main bulk of the conduit alone, one can dispose with advantage a supporting or stiffening layer around the layer of expansion material. This can be made of some conventional hose material.

The gas-producing element used in the expansion material can consist of any expansion agent at all, which achieves expansion in the polymer material at the desired temperature and time. Preferably the expansion should occur at a temperature between 100° and 200°C, and therefore expansion agents which give off gas in this temperature interval are preferred.

In putting the invention into practice at least one layer of expansion material can be disposed in immediate contact with the fluid. To achieve the desired fire resistance one could replace sections of an ordinary conduit with a conduit according to the invention, especially those sections which are liable to fire or other intense heating.

The invention is illustrated below with several preferred embodiments in connection with the enclosed drawing. It should be pointed out that it is not claimed that any of the conduits shown in the Figures is represented according to scale.

Figure 1:
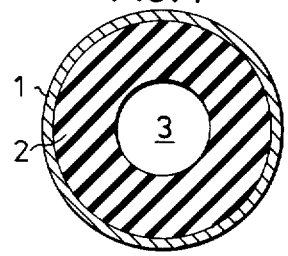
FIG. 1 shows an example of the conduit according to the invention.

FIG. 1 shows a cross section of a quite simple but important form of a conduit according to the invention. It consists of an outermost layer 1 of pressure and temperature resistent material and an inside expansion layer 2 which defines the central channel 3 for the fluid.

Figure 2:
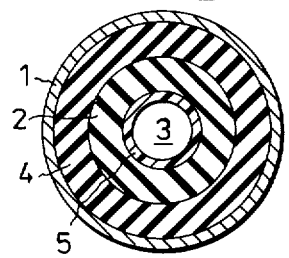
FIG. 2 shows a multi-layered modification.

The conduit in FIG. 2, also represented in cross section, has on the outside a pressure and temperature resistant layer 1. Inside of this come, in consecutive order, a supporting or stiffening layer 4, a layer 2 which expands at excessive temperature and an insulating layer 5. Innermost is the channel 3 for the fluid. The pressure and temperature resistant layer can consist of wire including metal wire and can also be placed between the layers 2 and 4, in which case it also serves as a heat conducting layer.

Figure 3:
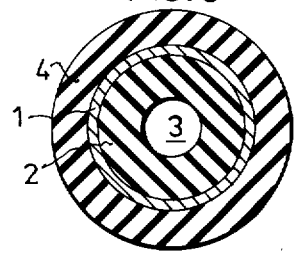
FIG. 3 shows a preferred multi-layered arrangement.

FIG. 3 shows an example of an especially preferred embodiment of the invention. Outside of the flow channel 3 there is an expansion layer 2 of unvulcanized epichlorhydrine rubber (manufactured by, for example, B. F. Goodrich Chemical Co. under the trade name "Hydrin" and by Hercules Inc. under the trade name "Herclor"). An expansion or blowing agent Celogen AZ is mixed into the epichlorhydrine rubber. This element is an azocarbonamide with a decomposition temperature of 196°C. By adding so-called BIK, a carbamide which accelerates the decomposition of the expansion agent, a decomposition temperature of about 130°C is obtained. Celogen AZ produces nitrogen gas when decomposed and is self-extinguishing. A wire reinforcement 1 is disposed outside of the expansion layer 2, and this reinforcement has a three-fold function. It constitutes, during heating, a pressure barrier for the expanding rubber 2, it quickly carries off heat from the heating zone, increasing the preconditions so that a larger area around the fire centre can expand, and lastly it serves as earth connection. Outside of the reinforcement there is a relatively thin layer 4 of epichlorhydrine rubber provided with a fire resistant additive disposed as an outer cover.

Figure 4:
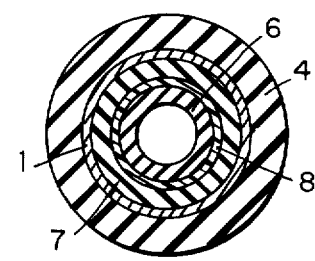
FIG. 4 shows another modification.

Another example of a conduit according to the invention is shown in FIG. 4, comprising a hose in which the expansion polymer material is a layer 6 consisting of or containing polyurethane. Next to this layer there is a layer 7 with isocyanate material, these two layers being separated by a temperature responsive layer 8, known in the art, which melts at a predetermined temperature of about 100°–200°C. At higher temperature the temperature responsive layer melts so that the polyurethane and the isocyanate come into contact with one another causing immediate expansion. A pressure and temperature resistant layer is appropriately disposed outside of the polyurethane layer and the inside of the hose is preferably covered with an insulating layer resistant to the fluid.

What I claim is:

1. A conduit for the transport of combustible material, comprising inner and outer layers, said inner layer comprising a temperature-responsive expansible polymeric material containing a blowing agent causing expansion upon heating to a predetermined temperature thereby to block the flow channel of the conduit, said outer layer comprising pressure and temperature-resistant material and surrounding said inner layer to direct the expansion of said inner layer radially inwardly.

2. A conduit for the transport of combustible material, comprising inner and outer layers, said inner layer comprising two materials separated by an interposed material, said interposed material melting at a predetermined high temperature to cause said two materials to come into contact with each other and to react chemically with each other and to expand upon reaction thereby to block the flow channel of the conduit, said outer layer comprising pressure and temperature-resistant material and surrounding said inner layer to direct the expansion of said inner layer radially inwardly.

* * * * *